July 4, 1950  R. H. HOLSING  2,513,412
ARBOR
Filed May 2, 1949
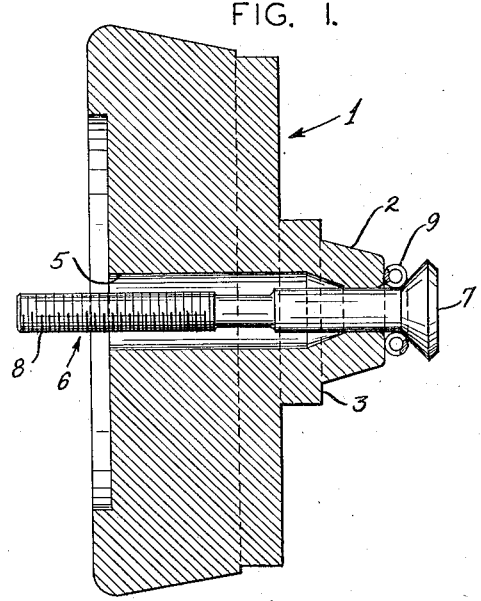
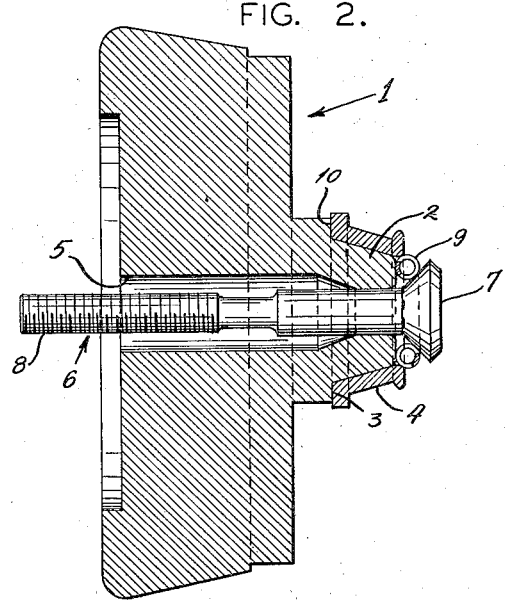
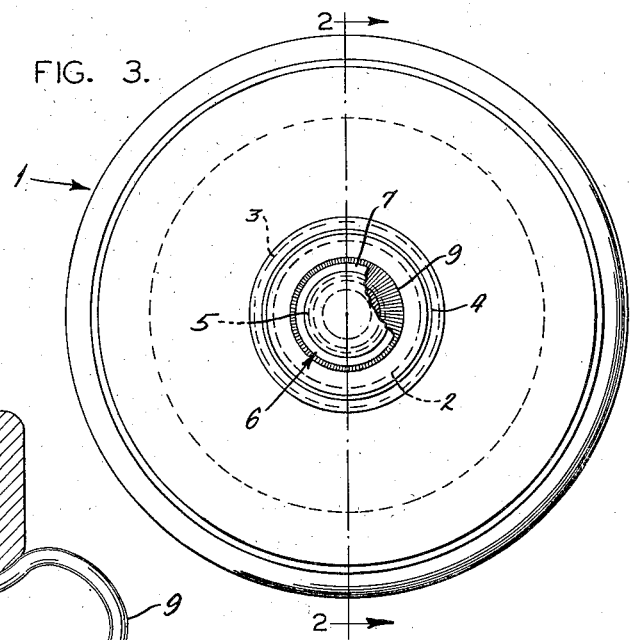
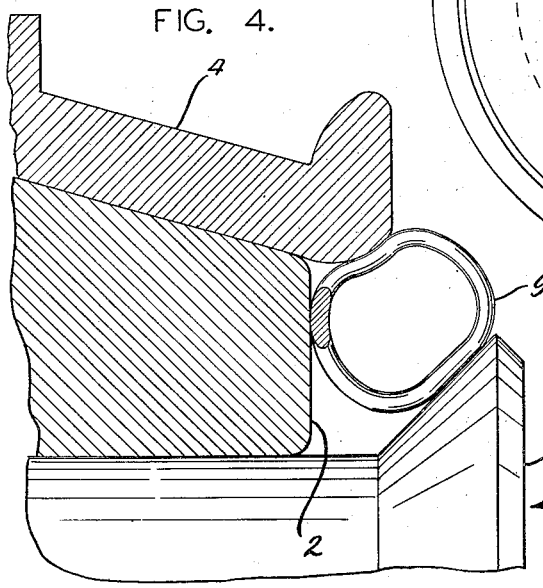
INVENTOR:
Robert H. Holsing,
by Cann Nan Gravely,
HIS ATTORNEYS.

Patented July 4, 1950

2,513,412

UNITED STATES PATENT OFFICE 2,513,412

ARBOR

Robert H. Holsing, North Canton, Ohio, assignor to The Timken Roller Bearing Company, Canton, Ohio, a corporation of Ohio Application May 2, 1949, Serial No. 90,947

6 Claims. (Cl. 279—2)

This invention relates to arbors for supporting and rotating workpieces during an operation performed on the external peripheral surface thereof. In particular, it relates to arbors for supporting and rotating a conical roller bearing inner raceway member during the grinding of the external peripheral surface thereof.

This invention comprises a base portion with a workseat having an axial bore therethrough, a drawrod within said axial bore, said drawrod having a head thereon projecting beyond said workseat, and a spring positioned between the workseat on the base portion and the head on the drawrod.

The object of this invention is to provide an extremely simple, economical, and effective springlike friction holding element.

The invention also consists in the parts and arrangements and in the combination of parts hereinafter described and claimed.

In the accompanying drawings, which form a part of this specification wherein like numerals refer to like parts wherever they occur:

Fig. 1 is a vertical cross-sectional view of an arbor construction embodying this invention, Fig. 2 is a vertical cross-sectional view of the device with a workpiece thereon and with the drawrod moved slightly leftwardly, Fig. 3 is a right end view of the device with the workpiece thereon as shown in Fig. 2, and Fig. 4 is an enlarged vertical cross-sectional view showing the position of the coil spring in the locked or operating position.

This invention is shown embodied in a construction comprising a base portion 1 with a workseat 2 thereon. In the preferred embodiment, the workseat 2 is in the form of a truncated cone having an annular abutment shoulder 3 at the base of said cone so positioned that the right end face of a workpiece 4, as viewed in the drawings, on said workseat 2 will project beyond the end of said workseat 2. Extending through an axial bore 5 in the base portion 1 and the workseat 2 is a drawrod 6 having a tapered head 7 thereon projecting beyond the end of said workseat 2 and screw threads 8 thereon at the end. In the annular space between the workseat 2 and the tapered head 7 on the drawrod 6 is a coil spring 9.

In its inoperative position, as shown in Fig. 1, the coil spring 9 is in its natural shape, there being no force exerted upon it by the head 7 of the drawrod 6. With the parts in this position, the bore of the workpiece 4 is slipped over the head 7 of the drawrod 6 until the base 10 of said workpiece 4 abuts against the annular abutment shoulder 3. The outer diameter of the coil spring 9 and the greatest diameter of the head 7 of the drawrod 6 are smaller than the smallest diameter of the bore of the workpiece 4 allowing the workpiece 4 to be slipped on the workseat 2 easily. Fig. 2 shows the parts in assembled relation with the drawrod 6 pulled slightly leftwardly and thereby expanding the coil spring 9.

In operation, with the base portion 1 and workseat 2 rotating but not laterally movable, the drawrod 6 is moved by a suitable means (not shown) leftwardly causing the head 7 of said drawrod 6 to exert a force against the coil spring 9 thereby forcing said coil spring 9 outwardly until said coil spring 9 contacts the end of bore of the workpiece 4. Thereafter, continued leftward movement of the drawrod 6 causes the individual coils of coil spring 9 to be distorted, as shown in Fig. 4, thereby securing and supporting the workpiece 4 for an operation to be performed on the external peripheral surface thereof. In this position each coil in said coil spring 9 becomes a friction member for holding the workpiece 4 against rotation relative to the workseat 2.

When the drawrod 6 is moved rightwardly, the coil spring 9 returns to its original shape and position and the workpiece 4 may be slipped off the workseat 2 and over the coil spring 9 and the head 7 of the drawrod 6. Obviously, the hereinbefore described arbor admits of considerable modification without departing from the invention. For example, the workseat may be a cylindrical surface instead of the frusto-conical surface as shown in the preferred embodiment and the external peripheral surface may be frusto-conical or cylindrical. Therefore, I do not wish to be limited to the precise arrangements shown and described.

What I claim is:

1. An arbor comprising a base portion with a workseat thereon, said base portion and workseat having an axial bore therethrough, a drawrod within said axial bore, said drawrod having a head thereon projecting beyond said workseat, and a spring positioned between the workseat and the head of the drawrod.

2. An arbor comprising a base portion with a tapered workseat thereon, said base portion and tapered workseat having an axial bore therethrough, a drawrod within said axial bore, said drawrod having a head thereon projecting beyond said tapered workseat, and a spring positioned between the tapered workseat and the head of the drawrod.

3. An arbor comprising a base portion with a workseat thereon adapted for receiving a workpiece of longer length than said workseat so as to project therebeyond, said base portion and workseat having an axial bore therethrough, a drawrod within said axial bore, said drawrod having a projection thereon, and a coil spring positioned between said workseat, the workpiece, and the projection on the drawrod.

4. An arbor comprising a base portion with a workseat thereon adapted for receiving in overhanging relationship the bore of a workpiece, said base portion and workseat having an axial bore therethrough, a drawrod within said axial bore, said drawrod having a tapered head thereon projecting beyond said workseat and a coil spring positioned between said workseat, the workpiece, the drawrod and the tapered head of the drawrod.

5. An arbor comprising a base portion with a workseat thereon adapted for receiving the bore of a workpiece of longer axial length than said workseat so as to project therebeyond, said base portion and workseat having an axial bore therethrough, a drawrod within said axial bore, said drawrod having a head thereon projecting beyond the end of said workseat, and a coil spring positioned between said workseat, the workpiece and the head of the drawrod.

6. An arbor comprising a base portion with a tapered workseat thereon adapted for receiving the tapered bore of a workpiece of greater length than said tapered workseat so as to project therebeyond, said base portion and tapered workseat having an axial bore therethrough, a drawrod within said axial bore, said drawrod having a head thereon projecting beyond the end of said workpiece, and a coil spring positioned between said tapered workseat, the workpiece, and the head of the drawrod, said coil spring having a smaller outside diameter than the smallest inside diameter of the tapered bore of the workpiece.

ROBERT H. HOLSING.

REFERENCES CITED

The following references are of record in the file of this patent:

UNITED STATES PATENTS

| Number | Name | Date |
|---|---|---|
| 574,763 | Rudolph | Jan. 5, 1897 |
| 1,235,957 | Bidwell | Aug. 7, 1917 |
| 1,316,709 | Gray | Sept. 23, 1919 |
| 2,111,956 | Baldwin | Mar. 22, 1938 |
| 2,358,408 | McMurray | Sept. 19, 1944 |
| 2,469,873 | Ernest | May 10, 1949 |